Figure 1:
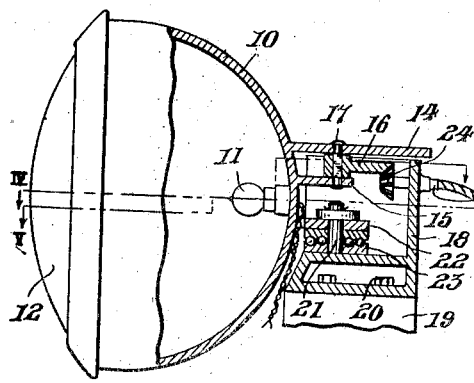

K. DOMBKOWSKI.
SAFEGUARD LAMP FOR AUTOMOBILES.
APPLICATION FILED JUNE 16, 1919.

1,326,918.

Patented Jan. 6, 1920.
2 SHEETS—SHEET 1.

Inventor
K. Dombkowski.

By A. M. Wilson
Attorney

K. DOMBKOWSKI.
SAFEGUARD LAMP FOR AUTOMOBILES.
APPLICATION FILED JUNE 16, 1919.

1,326,918.

Patented Jan. 6, 1920.
2 SHEETS—SHEET 2.

Inventor
K. Dombkowski

By N. M. Nelson

Attorney

UNITED STATES PATENT OFFICE.

KAZIMER DOMBKOWSKI, OF STANHOPE, NEW JERSEY.

SAFEGUARD-LAMP FOR AUTOMOBILES.

1,326,918.  Specification of Letters Patent.  Patented Jan. 6, 1920.

Application filed June 16, 1919. Serial No. 304,512.

*To all whom it may concern:*

Be it known that I, KAZIMER DOMBKOWSKI, a citizen of the United States of America, residing at Stanhope, in the county of Sussex and State of New Jersey, have invented certain new and useful Improvements in Safeguard-Lamps for Automobiles, of which the following is a specification.

This invention relates to lamps for vehicles and more especially to what are known as dirigible headlights for automobiles, the primary object being to automatically swing the headlight for throwing the beams or rays therefrom upon the pathway when the vehicle is being turned or steered in any direction.

A further object of the invention consists in providing a headlight adapted for automatic turning by the steering wheel of an automobile for pointing in the direction of the future path of travel indicated by the steering operation, the structure being simple, easily and cheaply installed upon a vehicle.

A still further object of the invention is to provide a dirigible headlight operated by the steering column of an automobile and provided with means rendering the same inoperative whenever desired such as during the daytime so that the headlight will remain stationary but ready for automatic swinging movement when found desirable.

With these general objects in view, the invention consists of the novel combination and arrangement of parts hereinafter fully described in connection with the accompanying drawings and in which like reference characters designate corresponding parts throughout the several views.

Figure 10:
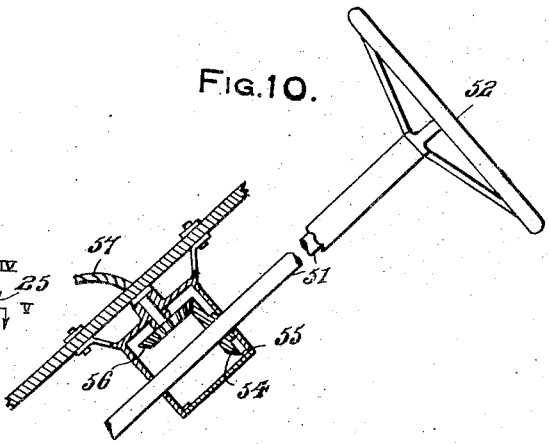
Figure 3:
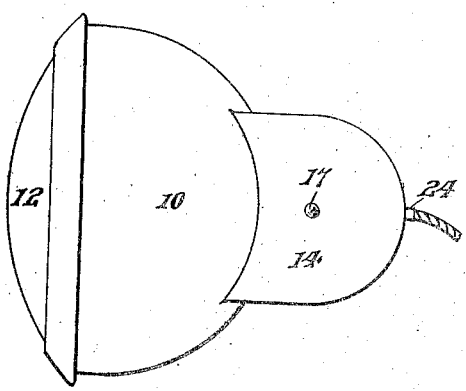
Figure 4:
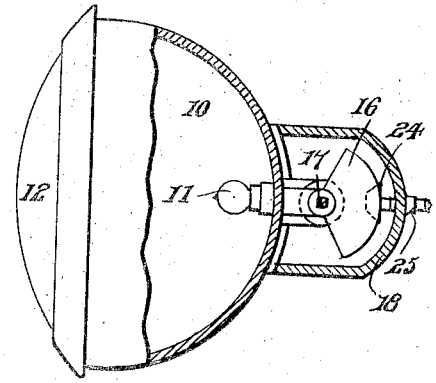
Figure 5:
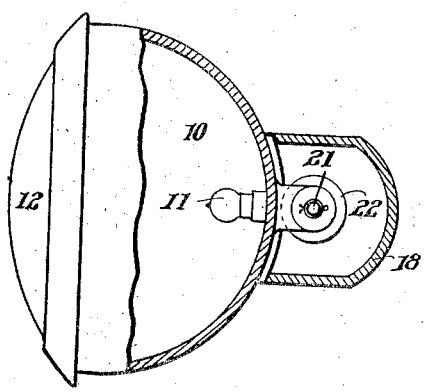
Figure 11:
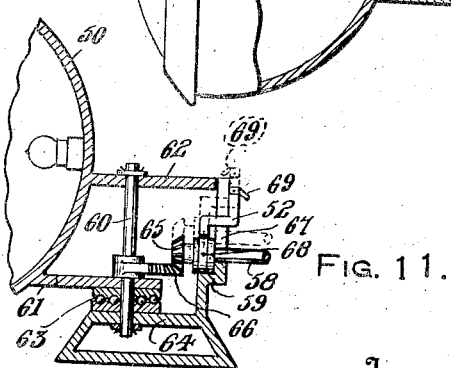
Figure 7:
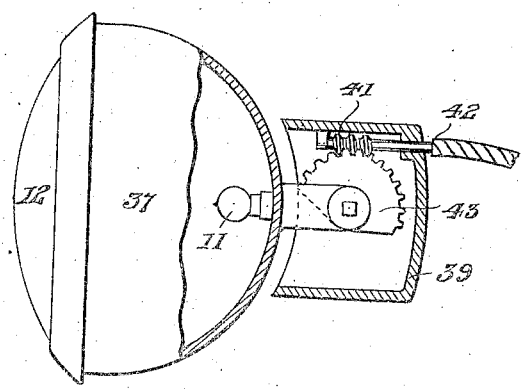
Figure 8:
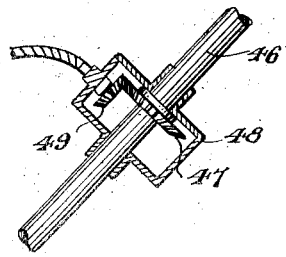
Figure 6:
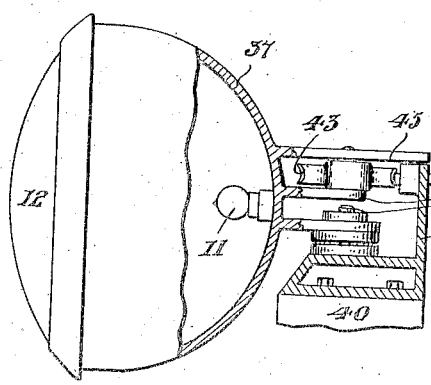
Figure 9:
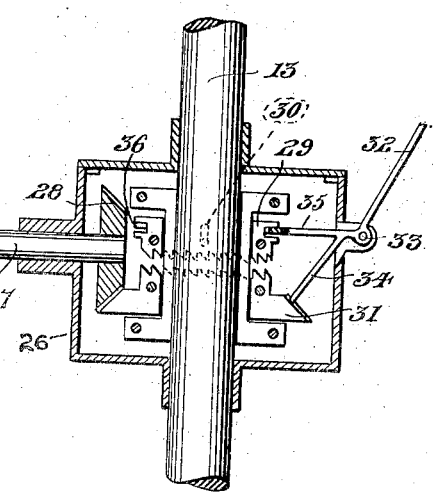
Figure 2:
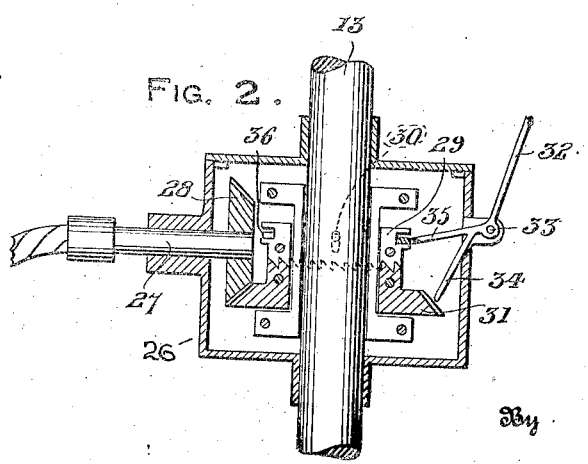

In the drawings,

Figure 1 is an elevational view of a headlight with a portion thereof and its mounting means illustrated in vertical section and formed after the manner of my invention, Fig. 2 is a sectional view of operable connections therefor mounted on the steering shaft, Fig. 3 is a top plan view of the invention as shown in Fig. 1, Figs. 4 and 5 are horizontal sectional views taken upon lines IV—IV and V—V respectively of Fig. 1, Fig. 6 is a view similar to Fig. 1 showing a worm and gear shifting means for the headlight, Fig. 7 is a horizontal sectional view of the structure shown in Fig. 6, Fig. 8 is a sectional view of operating means therefor actuated by the steering shaft, Fig. 9 is a view similar to Fig. 2 showing the operative connections in their inoperative positions, Fig. 10 is a view similar to Fig. 8 showing a different form of steering shaft operating means and Fig. 11 is a vertical sectional view of a form of headlight bracket operated thereby.

My invention employs a headlight 10 of substantially the usual construction having an incandescent electric lamp 11 therein with a forward lens 12, the headlight, however, being adapted for lateral swinging movement upon the turning of the steering shaft 13. The headlight 10 has a rearwardly extending plate 14 with an arm 15 therebeneath and a segment gear 16 secured by a rivet 17 between the said arm and plate.

A casing 18 mounted upon any stationary portion such as 19 of the automobile and secured thereto by bolts 20 has an upright axle 21 upon which a rearwardly extending bracket 22 of the headlight 10 is journaled, suitable ball bearings 23 being provided therefor.

A pinion 24 upon the end of a flexible shaft member 25 is journaled in the casing 18 in constant mesh with the gear 16, whereby as will be evident, the turning of the shaft 25 in either direction swings the headlight 10 accordingly.

The steering shaft 13 of the automobile as illustrated in Figs. 2 and 9 of the drawings is of any usual construction, the same being turned a partial revolution in either direction during the steering of the vehicle either to the right or to the left. A casing 26 has the steering shaft 13 journaled therethrough while the end 27 of the flexible shaft 25 shown in Fig. 1 is journaled through the casing 26 with a gear 28 mounted upon said end 27 within the casing 26. A clutch member 29 is splined as at 30 upon the shaft 13 adapted to coöperate with a clutch member 31 journaled concentric with the shaft 13 in constant mesh with the gear 28. It will be evident that when the clutch member 29 is in engagement with the clutch member 31 as illustrated in Fig. 2 of the drawings, the turning of the shaft 13 in either direction will turn the flexible shaft 29, thereby laterally shifting the headlight in a corresponding direction. When the clutch member is elevated, however, out of mesh with the clutch member 31 as illustrated in Fig. 9, the shaft 13 is free to turn without any effect upon the headlight 10. A clutch lever 32 is pivoted as at 33 to the casing 26 having an operating fork within said casing, one member or prong 34 of which acts as a releasable stop for the gear 31 while the other prong 35 has a split collar 36 encircling the clutch member 29 for moving the same into and out of meshing engagement with the clutch member 31.

The complete operation of the invention will be understood from this detailed description thereof, the positioning of the clutch lever 32 at the limit of its movement toward the shaft 13 closes the clutch members 29 and 31 releasing the prong 34 from the member 31. The turning of the shaft 13 during the steering of the automobile turns the clutch member 31 thereby turning the gear 28, flexible shaft 25, pinion 24 and gear 16 and shifts the headlight 10 laterally in the same direction in which the shaft 13 is rotated in steering. When the clutch lever 32 is moved and the clutch members 29 and 31 disengaged as shown in Fig. 9, the steering shaft 13 is free to turn without in any manner affecting the clutch member 31 or the headlight 10. The clutch being released in the daytime, the headlight 10 will remain stationary, locked by the prong 34 engaging the teeth of the clutch member 31 while the closing of the clutch by the lever 32 positions the mechanism for shifting the headlight 10 laterally in accordance with the direction that the vehicle is being steered.

In Figs. 6, 7, and 8, substantially the same form of headlight 37 is shown mounted upon an axle 38 in a casing 39 secured to a rigid portion 40 of the automobile. A worm 41 upon the end of a flexible shaft member 42 is journaled through the casing 39 in mesh with a gear 43 carried by a rearwardly extending arm 44 and plate 45 of the headlight 37. The steering shaft 46 has a gear 47 within a stationary casing 48, the said gear 47 meshing with a pinion 49 upon the opposite end of the shaft 42 from the worm 41. The arrangement of the gears, pinion and worm connections between the steering shaft 46 and the headlight 31 may be changed at will for moving the headlight 37 in either direction desired, either vertically or laterally upon turning the shaft 46 during the steering of the vehicle.

In Figs. 10 and 11 of the drawings, I have illustrated a further embodiment of the invention in which the headlight 50 is laterally turned by means of the steering shaft 51, the operative connections being controlled by a lever 52 adjacent the headlight 50 rather than at a point adjacent the steering shaft as provided in the form set forth in Figs. 1 and 2 of the drawings. The shaft 51 which carries the steering wheel 53 has a pinion 54 within a stationary casing 55 meshing with a gear 56 of a flexible shaft 57. The shaft 57 has its outer end 58 journaled through a stationary bracket 59 upon the vehicle and upon which bracket, the headlight 50 is journaled for lateral movement by means of a shaft 60 secured to rearwardly extending plates 61 and 62 of the headlight with ball bearings 63 interposed between the plate 61 and the supporting portions 64 of the bracket 59. Upon turning the shaft 51 for steering the automobile, the end 58 of the flexible shaft 57 will be turned with its pinion 65, which being in mesh with a segment gear 66 upon the shaft 60, will result in laterally shifting the headlight 50 in the same direction as the vehicle is being steered.

The shaft end 58 is journaled through a slot 67 in the bracket 59 and end 68 of the lever 52 also having the end 58 journaled therethrough, it will be evident that upon elevating the lever 52, the pinion 65 will be disengaged from the gear 66 as illustrated by dotted lines in Fig. 11 of the drawings. A revolving detent 69 upon the lever 52 is swung to overlie the top of the bracket 59 when the lever 52 is elevated and at which times, the turning of the steering shaft 51 will have no effect upon the headlight 50 but upon releasing the detent 69, the lever 52 with the shaft end 58 may be lowered in the slot 67 bringing the pinion 65 in mesh with the gear 66 for automatically shifting the headlight during the steering of the vehicle.

The invention being primarily designed for automatically shifting the headlight of a vehicle during the usual steering of the same by means of the steering wheel 53, the forms of mechanism for accomplishing these results as well as for releasing the mechanism from operation are believed to be preferable although minor changes may be made therein without departing from the spirit and scope of my invention.

What I claim as new is:—

1. In combination with a pivotally mounted headlight and the steering shaft of an automobile, a gear carried by the headlight, a clutch member splined upon the shaft, a pinion journaled concentric with said shaft adapted for clutching engagement with said clutch member, flexible shaft connections in constant operative engagement with said pinion and gear, a casing inclosing the pinion and clutch member and operating means for said clutch member supported on said casing.

2. In combination with a pivotally mounted headlight and the steering shaft of an automobile, a gear carried by the headlight, a clutch member splined upon the shaft, a pinion journaled concentric with said shaft adapted for clutching engagement with said clutch member, flexible shaft connections in constant operative engagement with said pinion and gear, a stationary casing through which said shaft is journaled inclosing said pinion and clutch member, a clutch lever pivoted to said casing, a fork carried by said lever, one arm of said fork being operatively connected to said clutch member whereby the latter is released and engaged at will, the other arm of the fork member being adapted for engaging said pinion when the clutch member is released and being out of engagement when the clutch member is closed.

In testimony whereof I affix my signature.

KAZIMER DOMBKOWSKI.